United States Patent
Reed (10) Patent No.: US 8,610,358 B2
(45) Date of Patent: Dec. 17, 2013

(54) ELECTROSTATIC DISCHARGE PROTECTION FOR LUMINAIRE

(75) Inventor: William G. Reed, Seattle, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 147 days.

(21) Appl. No.: 13/212,074

(22) Filed: Aug. 17, 2011

(65) Prior Publication Data

US 2013/0043792 A1 Feb. 21, 2013

(51) Int. Cl.
*H05B 37/00* (2006.01)
*H05B 41/00* (2006.01)
*H05B 37/02* (2006.01)
*H05B 39/04* (2006.01)
*H05B 41/36* (2006.01)
*H05B 41/16* (2006.01)
*H05B 41/24* (2006.01)

(52) U.S. Cl.
USPC .......................................................... 315/126

(58) Field of Classification Search
None
See application file for complete search history.

(56) References Cited

U.S. PATENT DOCUMENTS

| | | | |
|---|---|---|---|
| 4,153,927 A | 5/1979 | Owens | |
| 4,237,377 A | 12/1980 | Sansum | |
| 5,086,379 A | 2/1992 | Denison et al. | |
| 5,160,202 A | 11/1992 | Légaré | |
| 5,230,556 A | 7/1993 | Canty et al. | |
| 5,343,121 A | 8/1994 | Terman et al. | |
| 5,349,505 A | 9/1994 | Poppenheimer | |
| 5,450,302 A | 9/1995 | Maase et al. | |
| 5,589,741 A | 12/1996 | Terman et al. | |
| 6,111,739 A | 8/2000 | Wu et al. | |
| 6,612,720 B1 | 9/2003 | Beadle | |
| 6,753,842 B1 | 6/2004 | Williams et al. | |
| 6,902,292 B2 | 6/2005 | Lai | |
| 7,066,622 B2 | 6/2006 | Alessio | |
| 7,122,976 B1 | 10/2006 | Null et al. | |
| 7,188,967 B2 | 3/2007 | Dalton et al. | |
| 7,196,477 B2 | 3/2007 | Richmond | |
| 7,239,087 B2 | 7/2007 | Ball | |
| 7,252,385 B2 | 8/2007 | Engle et al. | |
| 7,258,464 B2 | 8/2007 | Morris et al. | |
| 7,281,820 B2 | 10/2007 | Bayat et al. | |
| 7,314,291 B2 | 1/2008 | Tain et al. | |
| 7,317,403 B2 | 1/2008 | Grootes et al. | |

(Continued)

FOREIGN PATENT DOCUMENTS

DE 4001980 A1 8/1990
EP 1 734 795 A1 12/2006

(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

(Continued)

*Primary Examiner* — Douglas W Owens
*Assistant Examiner* — Dedei K Hammond
(74) *Attorney, Agent, or Firm* — Seed IP Law Group PLLC (57) ABSTRACT

An apparatus for protecting a solid state retrofit lighting or illumination system from electrostatic discharge damage caused by charge induced onto conductive surfaces of the lighting or illumination system.

12 Claims, 3 Drawing Sheets

(56) References Cited

U.S. PATENT DOCUMENTS

| | | |
|---|---|---|
| 7,322,714 B2 | 1/2008 | Barnett et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,524,089 B2 | 4/2009 | Park |
| 7,538,499 B2 | 5/2009 | Ashdown |
| 7,578,596 B2 | 8/2009 | Martin |
| 7,578,597 B2 | 8/2009 | Hoover et al. |
| 7,631,324 B2 | 12/2009 | Buonasera et al. |
| 7,633,463 B2 | 12/2009 | Negru |
| 7,688,222 B2 | 3/2010 | Peddie et al. |
| 7,703,951 B2 | 4/2010 | Piepgras et al. |
| 7,804,200 B2 | 9/2010 | Flaherty |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,334,640 B2 | 12/2012 | Reed et al. |
| 2002/0113192 A1 | 8/2002 | Antila |
| 2004/0095772 A1 | 5/2004 | Hoover et al. |
| 2004/0105264 A1 | 6/2004 | Spero |
| 2004/0120148 A1 | 6/2004 | Morris et al. |
| 2004/0201992 A1 | 10/2004 | Dalton et al. |
| 2005/0099802 A1 | 5/2005 | Lai |
| 2005/0135101 A1 | 6/2005 | Richmond |
| 2005/0174780 A1 | 8/2005 | Park |
| 2005/0243022 A1 | 11/2005 | Negru |
| 2005/0254013 A1 | 11/2005 | Engle et al. |
| 2006/0001384 A1 | 1/2006 | Tain et al. |
| 2006/0014118 A1 | 1/2006 | Utama |
| 2006/0034075 A1 | 2/2006 | Alessio |
| 2006/0053459 A1 | 3/2006 | Simerly et al. |
| 2006/0066264 A1* | 3/2006 | Ishigaki et al. ............... 315/291 |
| 2006/0158130 A1 | 7/2006 | Furukawa |
| 2006/0202914 A1 | 9/2006 | Ashdown |
| 2006/0262544 A1 | 11/2006 | Piepgras et al. |
| 2006/0277823 A1 | 12/2006 | Barnett et al. |
| 2007/0096118 A1 | 5/2007 | Mahalingam et al. |
| 2007/0102033 A1 | 5/2007 | Petrocy |
| 2007/0159819 A1 | 7/2007 | Bayat et al. |
| 2007/0247853 A1 | 10/2007 | Dorogi |
| 2007/0279921 A1 | 12/2007 | Alexander et al. |
| 2008/0018261 A1* | 1/2008 | Kastner ........................ 315/192 |
| 2008/0043106 A1 | 2/2008 | Hassapis et al. |
| 2008/0130304 A1 | 6/2008 | Rash et al. |
| 2008/0266839 A1 | 10/2008 | Claypool et al. |
| 2008/0271065 A1 | 10/2008 | Buonasera et al. |
| 2008/0291661 A1 | 11/2008 | Martin |
| 2009/0161356 A1 | 6/2009 | Negley et al. |
| 2009/0278474 A1 | 11/2009 | Reed et al. |
| 2009/0278479 A1 | 11/2009 | Platner et al. |
| 2009/0284155 A1 | 11/2009 | Reed et al. |
| 2010/0060130 A1 | 3/2010 | Li |
| 2010/0090577 A1 | 4/2010 | Reed et al. |
| 2010/0123403 A1 | 5/2010 | Reed |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2011/0001626 A1 | 1/2011 | Yip et al. |
| 2011/0026264 A1 | 2/2011 | Reed et al. |
| 2011/0175518 A1 | 7/2011 | Reed et al. |
| 2011/0310605 A1 | 12/2011 | Renn et al. |
| 2012/0262069 A1 | 10/2012 | Reed |

FOREIGN PATENT DOCUMENTS

| | | | | |
|---|---|---|---|---|
| FR | 2 883 306 A1 | 9/2006 | | |
| JP | 06335241 A | * 12/1994 | | H02M 3/28 |
| JP | 2001-333420 A | 11/2001 | | |
| JP | 2004-349065 A | 12/2004 | | |
| JP | 2006-244711 A | 9/2006 | | |
| WO | 02/076068 A1 | 9/2002 | | |
| WO | 03/056882 A1 | 7/2003 | | |
| WO | 2006/057866 A2 | 6/2006 | | |
| WO | 2007/036873 A2 | 4/2007 | | |
| WO | 2008/030450 A2 | 3/2008 | | |
| WO | 2009/040703 A2 | 4/2009 | | |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.

Littelfuse, "Application Note: Protecting LEDs in Product Designs," 2009, 2 pages.

Panasonic Electronic Components, "LED Lighting Solutions," 2009, 6 pages.

Renesas Electronics, "Zener Diodes for Surge Absorption—Applications of high-intensity LED," Apr. 2010, 1 page.

Tyco Electronics, "Circuit Protection," retrieved Jun. 10, 2011, retrieved from http://www.tycoelectronics.com/en/products/circuit-protection.html, 2 pages.

International Search Report, mailed Dec. 13, 2010 for PCT/US2010/035649, 3 pages.

International Search Report, mailed Dec. 15, 2010 for PCT/US2010/035658, 3 pages.

International Search Report, mailed Dec. 28, 2010 for PCT/US2010/035651, 3 pages.

International Search Report, mailed Jul. 9, 2009 for PCT/US2009/043171, 5 pages.

International Search Report, mailed Jun. 21, 2010 for PCT/US2009/064625, 3 pages.

International Search Report, mailed Oct. 8, 2012 for PCT/US2012/033059, 3 pages.

International Search Report, mailed Sep. 30, 2011 for PCT/US2011/021359, 3 pages.

Written Opinion, mailed Dec. 13, 2010 for PCT/US2010/035649, 4 pages.

Written Opinion, mailed Dec. 15, 2010 for PCT/US2010/035658, 3 pages.

Written Opinion, mailed Dec. 28, 2010 for PCT/US2010/035651, 3 pages.

Written Opinion, mailed Jul. 9, 2009 for PCT/US2009/043171, 8 pages.

Written Opinion, mailed Jun. 21, 2010 for PCT/US2009/064625, 5 pages.

Written Opinion, mailed Oct. 8, 2012 for PCT/US2012/033059, 3 pages.

Written Opinion mailed Sep. 30, 2011 for PCT/US2011/021359, 3 pages.

Reed et al., "Apparatus and Method for Schedule Based Operation of a Luminaire" U.S. Appl. No. 13/604,327, filed Sep. 5, 2012, 44 pages.

Reed et al., "Apparatus and Method of Operating a Luminaire," U.S. Appl. No. 13/558,191, filed Jul. 25, 2012, 84 pages.

Reed et al., "Apparatus, Method to Enhance Color Contrast in Phosphor-Based Solid State Lights," U.S. Appl. No. 61/534,722, filed Sep. 14, 2011, 53 pages.

Reed et al., "Gas-Discharge Lamp Replacement," U.S. Appl. No. 61/052,924, filed May 13, 2008, 32 pages.

Reed et al., "Low-Profile Pathway Illumination System," Amendment filed Jul. 29, 2011, for U.S. Appl. No. 12/437,472, 19 pages.

Reed et al., "Low-Profile Pathway Illumination System," U.S. Appl. No. 61/051,619, filed May 8, 2008, 25 pages.

Reed et al., "Low-Profile Pathway Illumination System," Notice of Allowance, dated Oct. 14, 2011, for U.S. Appl. No. 12/437,472, 9 pages.

Reed et al., "Low-Profile Pathway Illumination System," Office Action, dated May 5, 2011, for U.S. Appl. No. 12/437,472, 24 pages.

(56) References Cited

OTHER PUBLICATIONS

Reed et al., "Systems and Methods That Employ Object Recognition," U.S. Appl. No. 13/411,321, filed Mar. 2, 2012, 51 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Turbulent Flow Cooling for Electronic Ballast," U.S. Appl. No. 61/088,651, filed Aug. 13, 2008, 23 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Resonant Network for Reduction of Flicker Perception in Solid State Lighting Systems," U.S. Appl. No. 61/527,029, filed Aug. 24, 2011, 41 pages.
Renn et al., "Solid State Lighting Device and Method Employing Heat Exchanger Thermally Coupled Circuit Board," U.S. Appl. No. 61/357,421, filed Jun. 22, 2010, 49 pages.

\* cited by examiner

ELECTROSTATIC DISCHARGE PROTECTION FOR LUMINAIRE

BACKGROUND

1. Technical Field

This disclosure is generally related to electrostatic discharge (ESD) protection of a luminaire, illumination system.

2. Description of the Related Art

High voltage power lines generate large electric fields around the conductors, which can capacitively couple large electrostatic charges onto conductive surfaces located near the power lines. In some locations, outdoor lighting is located proximate to these high voltage power lines. The charges from the power lines can capacitively couple to the electronic circuits of the outdoor lighting sources in an effort to be dissipated to Earth ground. Traditional lighting technology using Incandescent, High Intensity Discharge (HID) or other magnetically ballasted lamps have proven to be resistant to Electrostatic Discharge (ESD) even when installed in close proximity to high voltage power lines.

BRIEF SUMMARY

Solid state lighting systems may be more susceptible to ESD in outdoor conditions, in comparison to traditional lighting technology. Lighting systems that are robust to the effects of ESD are desirable.

A lighting system may be summarized as including at least one light emitting diode; a power supply coupled to the at least one light emitting diode and operable to convert a received power signal into a feedback-regulated power signal that is provided to the at least one light emitting diode, the power supply, including: a rectifier; a transformer coupled to the rectifier and having a primary winding and a secondary winding; a switch operable to at least partially control current passing through the primary winding; a first overcurrent protection device coupled between an output of the rectifier and the primary winding; and a second overcurrent protection device coupled between the switch and a common voltage reference that is common to the rectifier and the primary winding; and a feedback circuit coupled between the at least one light emitting diode and the switch and operable to vary a magnitude of the feedback-regulated power signal.

The first current protection device may be a zener diode. The second current protection device may be a resistor. For example, the resistor may have a value of at least 631 Kiloohms and not greater than 3 Megaohms. The resistor may have a value of at least 1 Megaohm and not greater than 3 Megaohms. The switch may be at least one of a metal oxide semiconductor field effect transistor (MOSFET) and an insulated gate bipolar junction transistor (IGBT), and the second protection device may be connected in parallel to a capacitor and is resistively coupled to a source terminal of the MOSFET or an emitter terminal of the IGBT. The power supply may be a flyback converter. The feedback circuit may sense a current through the at least one light emitting diode and in response pulse-width may modulate a gate terminal of the switch to vary the magnitude of the feedback-regulated power signal.

A power supply to use with solid state lighting may be summarized as including a transformer with galvanically isolated primary side and a secondary side; and a discharge path that electrically couples at least one of at least one light emitting diode, or a heat sink to which the at least one light emitting diode is thermally coupled, to a common ground of the primary side of the transformer via an overcurrent protection resistor, a capacitor electrically coupled in parallel with the overcurrent protection resistor, and a diode to handle current induced in the light emitting diode or the heat sink.

As an example, the overcurrent protection resistor may have a resistance that is at least 631 Kiloohms and not greater than 3 Megaohms. The overcurrent protection resistor may have a resistance of at least 1 Megaohm and not greater than 3 Megaohms. The power supply may further include a bulk capacitor filter at which the diode electrically couples the induced current to the overprotection resistor, wherein the diode is a transient voltage suppressor (TVS).

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1:
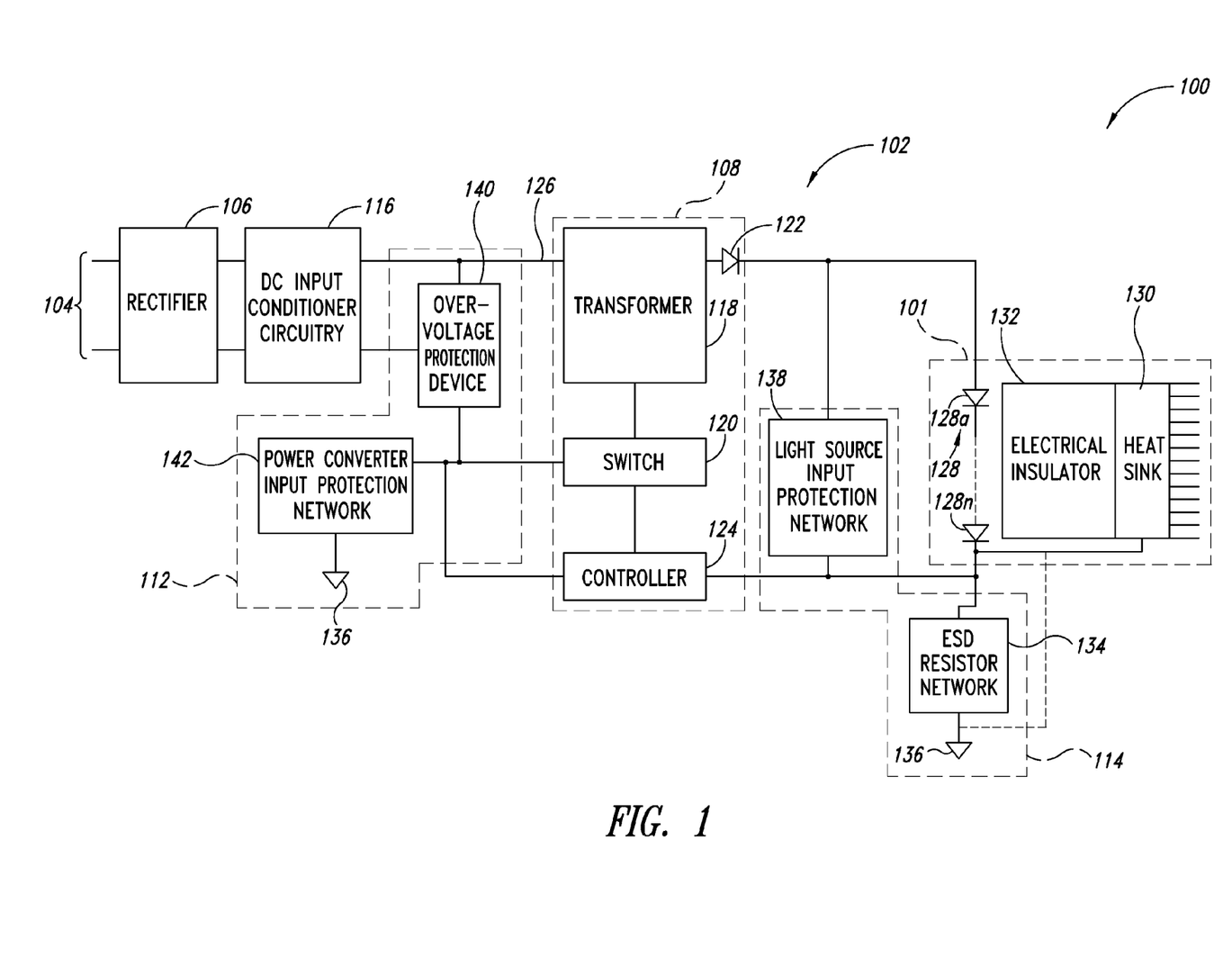
FIG. 1 is a block diagram of a lighting system, according to one illustrated embodiment.

FIG. 1 shows a lighting or illumination system 100, according to one embodiment. The description of FIG. 1 provides an overview of the structure and operation of the lighting system 100, which structure and operation are described in further detail with reference to FIGS. 2a and 2b.

As illustrated, the lighting system 100 includes a solid state lamp or light 101 and a power supply 102 coupled to supply electrical power to the lamp 101 and provide electrical discharge paths for discharging electrostatic charges induced by nearby voltage sources, for example power transmission lines.

The power supply 102 includes input terminals or nodes 104, rectifier 106, power converter 108, controller 124, and discharge paths 112 and 114. The power supply 102 may also include DC input conditioner circuitry 116.

As illustrated in FIG. 1, the power converter 108 may include a transformer 118, switch 120, diode 122 configured as a flyback DC/DC power converter, along with a controller 124 coupled to supply control signals to operate the switch 120. The transformer 118 may function as the inductor of the flyback converter topology. Alternatively, the power supply 102 may be configured as forward converter or other electronic galvanically isolated type power converter.

Where the lighting system 100 is configured for use as a retrofit, the input terminals or nodes 104 will typically consist of two terminals, without a dedicated ground. The approaches described herein for handling electrostatic discharge are particularly advantageous in environments where there are only two terminals or nodes, although such approaches can be applied in environments where more than two (e.g., three) terminals or nodes are provided, including a dedicated earth ground.

The rectifier 106 may include one or more discrete components, such as diodes, active switches (e.g., transistors such as MOSFETS, IGBTs), capacitors, and/or resistors, coupled to the at least one primary side winding to rectify and/or filter the voltage on the primary side of the transformer 118. The rectifier 106 will typically take the form of a passive diode bridge rectifier.

The DC input conditioner circuitry 116 may include one discrete component or several components connected together to smooth and otherwise condition a DC input voltage. The DC input voltage may be received from the input terminals or nodes 104, for example via the rectifier 106. Alternatively, DC input voltage may be received directly where available without the need for the rectifier 106. The voltage received at the DC input conditioner circuitry 116 may be a substantially pre-filtered DC voltage or may be a DC voltage from a full-wave or half-wave AC rectifier 106. The input conditioner circuitry 116 may be formed from a single capacitor coupled between the input terminals or nodes 104 to perform smoothing on the input voltage. Alternatively, input conditioner circuitry 116 may be formed from multiple capacitors, diodes, and a resistor to perform smoothing and other power conditioning.

The transformer 118 includes at least one primary side winding and at least one secondary side winding. The number of turns on the secondary side winding may be greater than the number of turns on the primary side winding so that the voltage induced on the secondary side of the transformer 118 is greater than the voltage on the primary side. The primary side of the transformer 118 may be coupled at a node 126 to the input terminals or nodes 104 via input conditioner circuitry 116 and rectifier 106, to receive a filtered voltage.

The lamp 101 may be coupled to an output of the power converter 108, for example coupled to the at least one secondary side winding of the transformer 118 via the diode 122 to receive power to illuminate one or more light sources 128a-128n (only two shown, collectively 128) of the lamp 101. The light sources 128 preferably take the form of solid state light sources, for example light emitting diodes (LEDs). The lamp 101 will typically include a relatively large number of discrete light sources 128, for example 12 or more, which will often be electrically coupled in series with one another to form one or more strings.

The lamp 101 may include a heat sink 130 and an electrical insulator 132 positioned to electrically insulate the discrete light sources (e.g., LEDs) 128 from the heat sink 130. The heat sink 130 may be formed from a thermally conductive block carried by a housing of the lamp 101. The thermally conductive block and the housing may be formed from steel, aluminum, copper, alloys thereof, or other thermally conductive metals or materials. The thermally conductive block may be directly coupled to the housing to transfer thermal energy to the housing via heat conduction. The thermally conductive block may also transfer thermal energy to the housing via thermal radiation.

The housing may be exposed to an external indoor or outdoor environment in which thermal energy from the thermally conductive block is dissipated. The housing and/or thermally conductive block may include one or more protrusions which may take the form of fins or pin fins to facilitate heat dissipation by radiation and convection. Additionally, the housing may provide protection to the various other components of the lighting system 100, such as a hermitic or weatherproof seal around the electronic components as protection from moisture and dirt.

The heat sink 130 may carry the electrical insulator 132. The electrical insulator 132 may be positioned on the heat sink 130 to provide an electrically protective barrier between the heat sink 130 and the light sources (e.g., LEDs) 128. The electrical insulator 132 may be formed from materials that are thermally conductive and electrically insulating, such as boron nitride, Kapton polymer, or FR-4 PCB material.

While providing electrical insulation, the boron nitride electrical insulator 132 may provide a much higher thermal conductivity than an electrical insulator such as silicon dioxide (glass) or a typical printed circuit board formed from woven glass and epoxy resin (FR-4). In particular, boron nitride may have a thermal conductivity of 30 W/(K·m), silicon dioxide typically has a thermal conductivity of approximately 1.38 W/(K·m), and FR-4 typically has a thermal conductivity of approximately 0.25 W(K·m). Thus, boron nitride may have a thermal conductivity that is roughly 20 times more conductive than silicon dioxide and a thermal conductivity that is approximately 120 times more conductive than FR-4. The electrical insulator 132 may be a dielectric configured to withstand a 500 V potential between the heat sink 130 and the light sources (e.g., LEDs) 128 or between the heat sink 130 and other discharge paths on the printed circuit board, according to one embodiment. Additionally or alternatively, each of the light sources 128 may provide electrical isolation from the heat sink 130 of up to 500 V.

The light sources (e.g., LEDs) 128 may be physically coupled to the electrical insulator 132 and may be electrically coupled to the transformer 118 through electrical traces carried by the electrical insulator 132. The light sources (e.g., LEDs) 128 may include a string of 16 LEDs coupled in series by coupling the cathode of a first LED to the anode of a second LED, and so forth, until each of the string of 16 LEDs are coupled together. Each LED may have a range of operating voltages ranging from 2.25 V to 3.5 V, so that the string of 16 LEDs may have a minimum turn on voltage of 36 V and may clamp at a maximum voltage drop of approximately 56 V.

Each of the light sources (e.g., LEDs) 128 may be manufactured having two Zener diodes coupled in parallel with each respective LED intended to provide ESD protection. A typical configuration of the two Zener diodes may include electrically coupling the anodes of the two Zener diodes to one another, electrically coupling the cathode of one of the two Zener diodes to the cathode of the respective LED, and electrically coupling the cathode of the other of the two Zener diodes to the anode of the respective LED. Such a back-to-back Zener diode configuration may be wire bonded to an LED or may be built into the LED, e.g., by an integrated circuit process. The back-to-back Zener diode configuration may provide some of the intended ESD protection to each of the light sources (e.g., LEDs) 128, but the ESD protection provided by the Zener diode arrangement is typically limited to low power discharges, such as might be generated by wind or direct discharge from a technician's body or equipment.

ESD protection from a typical back-to-back Zener diode configuration may be insufficient to provide protection against electrostatic charge build-up on the electrically conductive heat sink 130. Because the lighting system 100 may provide excellent lighting coverage outdoors, the lighting system 100 may be well-suited for lighting areas which happen to be in close-proximity to high-voltage power lines. High-voltage power lines generate large electric fields around the power line conductors, which can capacitively couple large electrostatic charges onto conductive surfaces nearby, such as the heat sink 130. When electrostatic charges are collected on the heat sink 130 and exceed the threshold of electrical protection provided by the electrical insulator 132, such as 500 V, the charges can discharge across the electrical insulator 132 and permanently damage the light sources (e.g., LEDs) 128, causing the light sources (e.g., LEDs) 128 to typically fail in the shorted mode.

Theoretical calculations of the capacitively coupled charge from a nearby power line may be very difficult due to the wide range of installation situations for lighting system 100. For example, the lighting system 100 may be mounted beneath a single high voltage line, near three lines carrying 3 phase current, or near an intersection of high voltage lines having many interconnecting conductors around insulators. The basic relationship of a single conductor near a lighting system 100 can be expressed as:

$$Q=(\epsilon VA)/d,$$

where:
Q=charge;
$\epsilon$=permittivity of air;
V=voltage on the power line;
A=area in meters of the lighting system, in particular the heat sink 130; and
d=distance between the line and the lighting system 100.
For this example, e is assumed to be approximately the permittivity of a vacuum which is $8.85 \times 10^{-12}$. Voltage for a standard power line is 69 kV. d for a typical installation may be is 2 meters. A is the area of an lighting system 100, which may be 0.047 square meters, such as for the Evluma™ Beacon™ model.

The current, I, can be calculated from the charge Q and the time of a 60 Hz line cycle as:

$$I=60\ Q.$$

In this example, a current of $8.6 \times 10^{-7}$ amps will flow into the lamp surface. Over long periods of time this current may build up enough voltage to discharge through the electrical insulator 132 to destroy the light sources (e.g., LEDs) 128. The permittivity of air with rain, fog, snow, hail or other water vapor will increase significantly above that of a vacuum. In a heavy rain, the permittivity may increase the permittivity of the air by a factor of 2 to 10,in which case the current will increase proportionally.

In the case where three-phase power transmission lines are in close proximity to the lighting system 100, the peak to peak measurements (frequency) of the combined voltages may effectively be 180 Hz, increasing the current by a factor of 3. If both three-phase power lines and high moisture content are present, the current may increase significantly, e.g., as much as 30 times that of the above calculation to 25.8 uA.

LED retrofit lighting or illumination systems may directly replace older technology lamps and may therefore be more susceptible to the type of ESD damage described above than newly installed solid state lighting and illumination systems. LED retrofit lighting or illumination systems may be used to replace traditional lighting technology that employ incandescent, high intensity discharge (HID), or other magnetically ballasted lamps which were powered with two line power connections without an Earth ground. These non-solid state traditional lighting technologies were generally resilient to ESD, even when installed proximate to high voltage power lines, and newly installed solid state lighting or illumination systems are typically connected to Earth ground to provide a discharge path for the charge induced onto circuits and other conductive portions of the lighting or illumination systems. As a result, LED retrofit lighting or illumination systems that are used to replace non-solid state traditional lighting technology may be more susceptible to ESD damage (especially near high voltage power lines), in part, due to insufficient paths for discharging electrostatic charges. The lighting system 100 is particularly suitable for use as an LED retrofit lighting or illumination system.

The discharge path 114 may be coupled to the lamp 101 to provide a return path for charge that may build up on the lamp 101. The discharge path 114 may include an ESD resistor network 134 coupled to a ground reference or potential node 136 and a light source input protection network 138.

The ESD resistor network 134 may couple the light sources (e.g., LEDs) 128 to the ground reference or potential node 136. The ESD resistor network 134 may include one or more resistors. The ESD resistor network 134 may provide a low resistance return path to the ground reference or potential node 136 for current flowing through the lamp 101. The ESD resistor network 134 may provide the low resistance return path through two resistors electrically coupled in parallel between the light sources (e.g., LEDs) 128 and the ground reference or potential node 136, according to one embodiment. The low-resistance return path to the ground reference or potential node 136 may provide a suitable conduction path for power induced onto the heat sink 130 from nearby voltage sources.

The light source input protection network 138 may be coupled between the transformer 118 and the ESD resistor network 134 to provide overvoltage protection across the light sources (e.g., LEDs) 128. Light source input protection network 138 may include a Zener diode electrically coupled in parallel to a resistor. The Zener diode may have a break down voltage that is approximately equal to the maximum voltage the light sources (e.g., LEDs) 128 are configured to clamp. For example, if the light sources 128 included a string of 16 LEDs with each LED capable of clamping 3.5 V, then the Zener diode may have a break down voltage of (16×3.5=) 56 V. Thus, a Zener diode in the light source input protection network 138 may provide overvoltage protection across the light sources (e.g., LEDs) 128.

The light source input protection network 138 may include a resistor electrically coupled in parallel across the light sources (e.g., LEDs) 128 from the transformer 118 to the ESD resistor network 134 to provide overvoltage protection from charges that may be induced during a testing mode of the lighting system 100. As discussed above, the transformer 118 may also include one or more capacitors coupled to the at least one secondary side winding to filter the voltage on the secondary side of the transformer 118. In one testing mode of the lighting system 100, the lighting system may be operated with the lamp 101 disconnected from the lighting system 100. In this mode, the transformer 118 may continue to charge one or more capacitors on the secondary side of the transformer 118 without providing a discharge path for the charge stored on the capacitors. Upon completion of testing and without the benefit of a resistor in the light source input protection network 138, the capacitors of the transformer 118 may rapidly discharge through the light sources (e.g., LEDs) 128 and cause permanent damage to the light sources (e.g., LEDs) 128. However, including a resistor in the light source input protection network 138 provides a path to discharge the capacitors while the light sources (e.g., LEDs) 128 are disconnected from the system. During normal operation, the resistor of the light source input protection network 138 may have a greater resistance than the forward bias resistance of the light sources (e.g., LEDs) 128 so that the resistance of the light source input protection network 138 does not substantially impact the flow of current through the light sources (e.g., LEDs) 128.

The discharge path 114 may also couple the heat sink 130 to the return path of the ESD resistor network 134. The discharge path 114 may provide a path which couples the heat sink 130 to the ground reference or potential node 136 through ESD resistor network 134 via the same connection as the light sources (e.g., LEDs) 128 so that the light sources (e.g., LEDs) 128 and the heat sink 130 may be connected to the lighting system 100 with just two physical connectors. As illustrated in phantom lines, the discharge path 114 may provide a path which directly couples the heat sink 130 to the ground reference or potential node 136 through a third conductor operating as a dedicated ground connector between the heat sink 130 and the ground reference or potential node 136, according to one embodiment.

The coupling between the heat sink 130 and the ground reference or potential node 136 provides a return path to ground for electrostatic charge that may induced upon the heat sink 130. As discussed above, high voltage power lines that are proximately located to the lighting system 100 may capacitively couple to the heat sink 130 and induce charge to be stored upon the heat sink 130 at a rate of up to 25.8 uA. The discharge path 114 between the heat sink 130 and the ground reference or potential node 136 may direct charge from the heat sink 130 into a common ground of the primary side of the transformer 118, as will be discussed in further detail below.

The controller 124 is coupled and configured to operate the switch 120. The controller 124 may include an oscillator and a pulse-width modulator driven by the oscillator. The controller 124 may vary the output of the transformer 118 by controlling the frequency and duration (i.e., duty cycle) of current flow through the primary side windings of the transformer 118. The controller 124 may control the duty cycle of current flowing through the primary side windings by selectively coupling the primary side windings of the transformer 118 to a ground reference or potential with a switch 120.

The switch 120 may take a variety of forms suitable for handling the expected currents and voltages. For example, the switch 120 may take the form of a metal oxide semiconductor field effect transistor (MOSFET), such as an n-channel MOSFET. The drain terminal of switch 120 may be connected or coupled to at least one primary side winding of transformer 118. The gate terminal and source terminal of switch 120 may be connected or coupled to respective terminals of the controller 124. Alternatively, the lighting system 100 may employ another type of switch, for example, an insulated gate bipolar transistor (IGBTs). While only one MOSFET is illustrated, the switch 120 may include two or more transistors electrically coupled in parallel.

The controller 124 may vary the output of the transformer 118 based upon an amount of voltage or an amount of current being applied to the light sources (e.g., LEDs) 128. The controller 124 may determine the amount of voltage or the amount of current being applied to the light sources (e.g., LEDs) 128 by comparing a reference voltage or potential to the voltage drop across the ESD resistor network 134. The ESD resistor network 134 may include low resistance resistors suitable for a current sensing circuit. Alternatively, the controller 124 may simply receive a signal indicative of whether or not current is flowing through the light sources (e.g., LEDs) 128 and may vary the output of the transformer 118 based upon a quantity of current that is determined to be flowing through the at least one primary winding of the transformer 118.

The controller 124 may also include a feedback subcircuit coupled between the discharge path 114 and the pulse-width modulator of the controller 124. The feedback subcircuit may be configured to enable the operation of the pulse-width modulator by transmitting an enable signal to the pulse-width modulator through an optocoupler. The optocoupler may be operable to electrically isolate and communicatively couple the feedback subcircuit to the pulse-width modulator.

The discharge path 112 may be operable to selectively couple node 126, switch 120, and controller 124 to the ground reference or potential node 136. The discharge path 112 may include an overvoltage protection device 140 operable to provide overvoltage protection to the node 126, may include a power converter input protection network 142 operable to provide overcurrent and/or overvoltage protection coming from ground, and may include the ground reference or potential node 136.

The overvoltage protection device 140 may be at least partially coupled between the input conditioner circuitry 116 and the transformer 118 to provide overvoltage protection to the transformer 118. The overvoltage protection device 140 may be a transient voltage suppression (TVS) diode that is configured limit the voltage at the node 126 to a specific maximum voltage. The TVS diode may have a breakdown voltage between 500-600 V and a maximum clamping voltage of 760 V, according to one embodiment. Thus, the overvoltage protection device 140 may provide overvoltage protection at the node 126 that may be caused by current conducted from the heat sink 130 across the electrical insulator 132 and onto the primary side of the transformer 118. For example, the overvoltage protection device 140 may clamp the voltage at the node 126 to a maximum of 760 V. Alternatively, the overvoltage protection device 140 may take the form of a common rectifier diode, without the additional functions of a TVS diode.

The power converter input protection network 142 may provide a path to the ground reference or potential node 136 for both low frequency and high frequency signals, as well as provide electrostatic discharge (ESD) protection to the light sources (e.g., LEDs) 128. The power converter input protection network 142 may include a capacitor and a resistor electrically coupled in parallel. Because capacitors function like an electrical short circuit at high frequencies, the capacitor of power converter input protection network 142 may provide a direct coupling to ground for high frequency signals, such as voltage oscillations caused by each closing of switch 120 and such as ESD voltage spikes which may be induced at node 126. Thus, the discharge path 112 may provide a path for high frequency signals to the ground reference or potential node 136 through the capacitor of the power converter input protection network 142.

The power converter input protection network 142 may discharge any charge or voltage that is stored across the capacitor of the power converter input protection network 142 through the resistor that is electrically coupled in parallel to the capacitor. Generally, a resistor discharges approximately 95% of the charge or voltage stored across a capacitor that is coupled in parallel to the resistor within three time-constants ($3*\tau$), where $\tau=R*C$ seconds. The resistor-capacitor configuration of the power converter input protection network 142 may thus continuously discharge voltages that may be intentionally or unintentionally induced across the capacitor of the power converter input protection network 142 over time.

The resistor of the power converter input protection network 142 may also provide a path for charge to flow from the ground reference or potential node 136 into the primary side common connection of transformer 118. As discussed above, charge induced onto the heat sink 130 may be selectively distributed to the ground reference or potential node 136 through discharge path 114. This induced or discharged current that is injected into the ground reference or potential node 136 is then coupled to a common node of the primary side of the transformer through the resistor. The value of the resistor may be small enough to conduct the induced current while keeping the voltage potential across the electrical insulator 132 below the break down threshold of the electrical insulator 132.

Tests have indicated that a value of 1.5 MΩ may be low enough to conduct the induced current without damaging the light sources (e.g., LEDs) 128.

The power converter input protection network 142 may also comply with government noise limit regulations. The capacitor of power converter input protection network 142 may be used in the lighting system 100 to conduct electromagnetic interference (EMI) energy back into the primary side of the transformer 118 to maintain system noise levels within electrical noise limits established by the government agencies, such as the federal communications commission (FCC).

Additional government rules and regulations may place limitations on the value of resistor that is used in the power converter input protection network 142. For example, some regulations may place limitations on the quantity of leakage current that is allowed to flow from the transformer 118 through the power converter input protection network 142. One government regulation may limit leakage current from a lighting system to 3.5 mA. A lighting system may be tested during production to ensure that the system operates within regulatory limitations.

An example of a production test of a lighting system includes a high potential (HiPot) test. The HiPot test applies a DC voltage across a lighting system and the current discharged into a ground terminal may be measured. Accordingly, the lower limit of the value of the resistor in the power converter input protection network 142 may be set to 631 kΩ to limit the leakage current from the lighting system 100 to 3.5 mA when 2206 VDC is applied across the lighting system 100 during HiPot testing, according to one embodiment.

Another example of a production test of a lighting system is to apply 3000 VDC to a lighting system 100 for 1 second while measuring the maximum current flowing through the system. The value of the resistor in the power converter input protection network 142 may be selected to be 1 MΩ to limit the maximum current flowing through the lighting system 100 to 3 mA, according to one embodiment.

To compensate for tolerance errors in HiPot testers, to overcome potential caused by resistor tolerances, and to compensate for leakage around the resistor while the resistor is coupled to a printed circuit board, a value of 1 MΩ or greater may be selected for the resistor of the power converter input protection network 142 even though a 631 kΩ resistor may suffice.

Figure 2A:
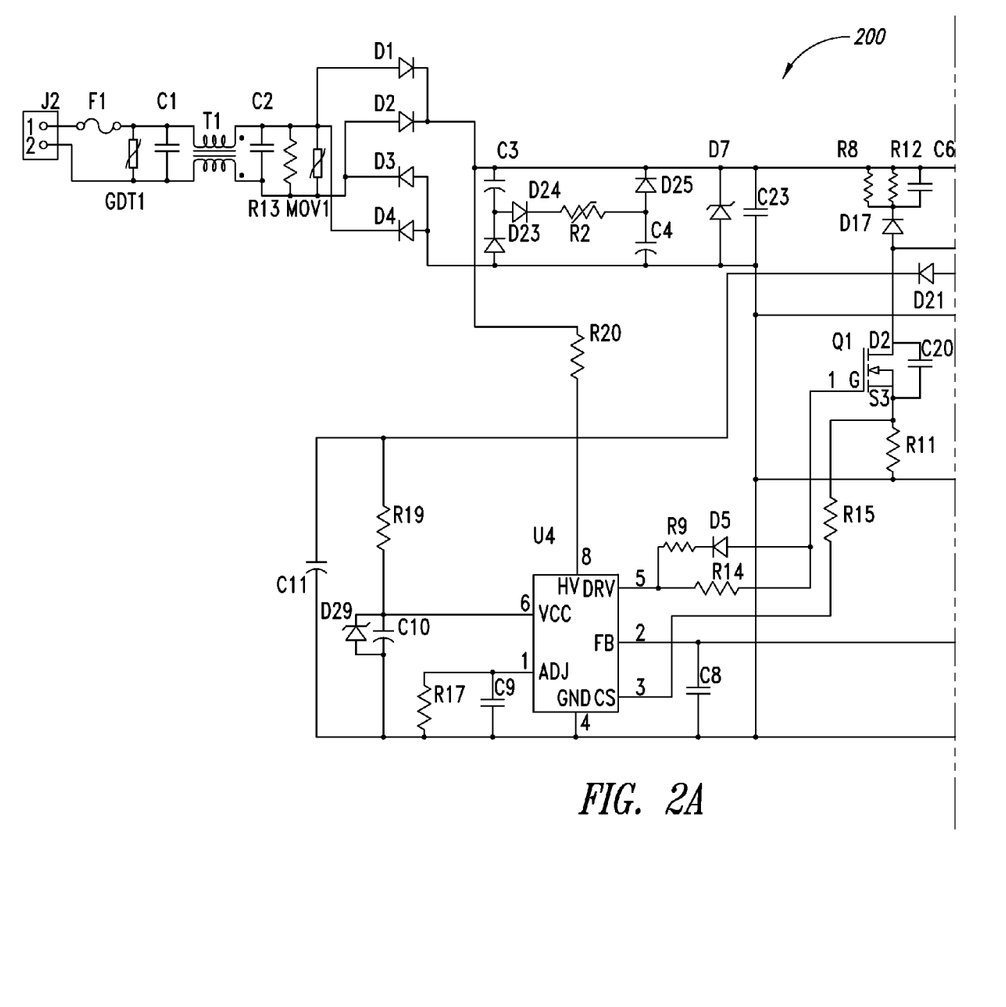
FIGS. 2a and 2b are a detailed electrical schematic diagram of the lighting system illustrated in FIG. 1, according to one illustrated embodiment.
Figure 2B:
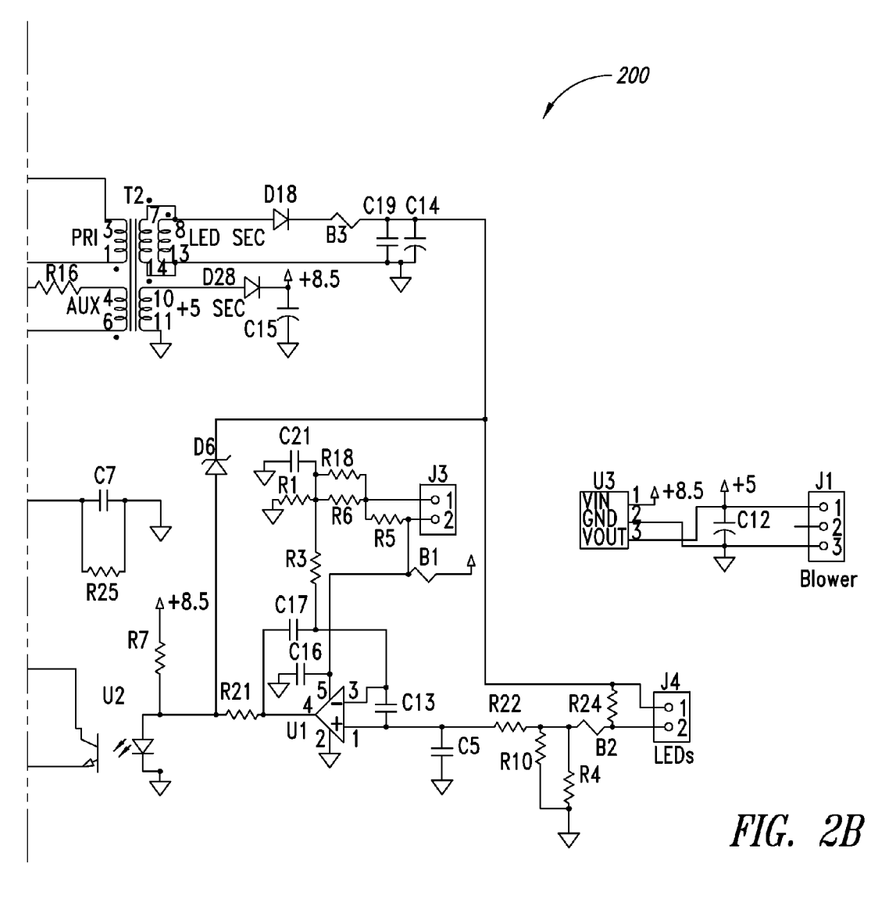

FIGS. 2a and 2b (collectively, FIG. 2) show a lighting system 200. The lighting system 200 may be a detailed implementation of the lighting system 100 (FIG. 1).

The lighting or illumination system 200 may, for example, include a flyback power converter to supply power to a lamp 101, as described above in connection with FIG. 1. The lighting system 200 may be roughly broken into three major subcircuits, an AC to DC converter, a feedback circuit, and a regulating circuit.

The AC to DC converter of lighting system 200 includes a rectifier circuit, AC conditioning circuitry, DC conditioning circuitry, a converter transformer T2, and LED input smoothing circuitry.

The rectifier circuit includes an input terminal or node and a full-wave rectifier. The input terminals or nodes 1, 2 are coupled to connector J2. Connector J2 may represent a screw-type connector similar to what is compatible with a screw-in light socket. Terminals 1, 2 may receive AC voltage from screw-in light socket, transmit the voltage through fuse F1 to the AC conditioning circuitry via a high input power line and a ground input power line. Terminal 1 may be coupled to supply a source of AC voltage to the high input power line, and terminal 2 may be coupled to supply a ground reference to the ground input power line.

The AC conditioning circuitry may include an input filter coupled between the input terminals or nodes and the full-wave rectifier. The input filter may include a capacitor C1 coupled across the input power lines ahead of the AC transformer T1 as well as a capacitor C2 and a resistor R13 each coupled across the input power lines in parallel following the AC transformer T1. The AC transformer T1 may be configured as an input inductor in the input filter.

The rectifier circuit may be configured to receive an AC voltage from the AC conditioning circuitry and rectify the AC voltage into a DC signal. The rectifier circuit includes a diode D1, a diode D2, a diode D3, and a diode D4. The diodes D1-D4 are configured as a full-wave rectifier, according to one embodiment.

The DC conditioning circuitry may be coupled between the rectifier circuit and the converter transformer T2 to reduce the ripple on the voltage signal that may be output from the rectifier circuit. The DC conditioning circuitry may include a polarized capacitor C3 having a first terminal coupled to a the cathode terminals of D1 and D2 of the rectifier circuit. A second terminal of capacitor C3 is coupled to a cathode terminal of a diode D23, the diode D23 having an anode terminal coupled to the anode terminals of diode D3 and diode D4 of the rectifier circuit. The DC conditioning circuitry may also include a diode D24 having an anode terminal coupled to the cathode terminal of diode D23 and having a cathode terminal coupled to a first terminal of resistor R2. A second terminal of resistor R2 may be coupled to an anode terminal of diode D25 and to a first terminal of capacitor C4. A second terminal of capacitor C4 may be coupled to the anode terminals of diodes D3, D4, and D23. The cathode terminal of diode D25 may be coupled to the cathode terminals of diodes D1 and D2 and to the first terminal of capacitor C3.

The DC conditioning circuitry may include a TVS diode D7 to provide an overvoltage protection discharge path to protect the lighting system 200 from high voltage signals, such as are associated with ESD and induced currents, as discussed in connection with FIG. 1. The TVS diode may have a breakdown voltage in the range of 522 V to 578 V and may have a maximum clamping voltage of 760 V at 0.52 A. The TVS diode D7 may be operable to conduct undesirable induced current back into diodes D23-D25 and capacitors C3-C4 of the filter circuit.

The converter transformer T2 is coupled to receive an input voltage from the DC conditioning circuitry. The converter transformer T2 may have a primary winding PRI and an auxiliary winding AUX. The primary winding PRI may be configured to supply magnetic fields to an LED secondary winding LED SEC, and the auxiliary winding AUX may be configured to provide a magnetic field to an 5-volt secondary winding +5V SEC.

The LED secondary winding LED SEC may be coupled to LED input conditioning circuitry. The LED input conditioning circuitry may include a diode D18, a capacitor C19, and a capacitor C14 to smooth the output of the converter transformer T2 before the output of the converter transformer T2 is supplied to light sources (e.g., LEDs) 128 via connector J4.

The LED secondary winding LED SEC may also be coupled to a Zener diode D6 and a resistor R24. The Zener diode D6 may be configured to limit the maximum voltage drop across the light sources (e.g., LEDs) 128. The Zener diode D6 has a breakdown voltage of 56 V, according to one embodiment. The resistor R24 may be coupled across the light sources (e.g., LEDs) 128 via connections across terminals 1, 2 of connector J4. The resistor R24 may provide a discharge path for capacitors C19 and C14 of the LED input conditioning circuitry that is coupled to the secondary side of converter transformer T2.

The feedback circuit of the lighting system 200 may be coupled to the light sources (e.g., LEDs) 128 through connector J2 and may include current sense resistors R4, R10, an operational amplifier (opamp) circuit U1, and an optocoupler U2.

The current sense resistors may be configured to supply a return path for the current flowing through the light sources (e.g., LEDs) 128. The current sense resistors may include resistor R4 and resistor R10. The connector J4 may provide a two conductor connection between the light sources (e.g., LEDs) 128 and the remainder of the lighting system 200. The current sense resistors R4, R10 may be coupled to the cathode of at least one of the light sources (e.g., LEDs) 128 through the terminal 2 of connector J4. The current sense resistors R4, R10 may have a very low resistance to permit current to flow from the light sources (e.g., LEDs) 128 to ground while still providing a voltage drop that is detectable by the opamp U1.

The opamp U1 may be configured to detect the voltage drop across the current sense resistors R4, R10 and provide an output to drive the optocoupler U2. The opamp U1 may include various negative feedback paths to integrate the voltage levels detected across current sense resistors R4, R10. The opamp U1 may output a high voltage while a voltage is detected across current sense resistors and output a low voltage while a voltage is not detected across current sense resistors.

The optocoupler U2 emits light in response to the output of opamp U1. While the output of the opamp U1 is high, a photon emitter of the optocoupler U2 emits photons to turn ON a phototransistor. While the output of the opamp U1 is low, the photon emitter of the optocoupler U2 does not emit photons, and the phototransistor remains OFF. Thus, the phototransistor may pull a respective collector terminal low in response to current flowing through light sources (e.g., LEDs) 128 because the opamp U1 drives the photon emitter with a high output while the opamp U1 detects a voltage across current sense resistors R4, R10.

Accordingly, the feedback circuit which may include current sense resistors, an opamp, and an optocoupler may provide an enable signal while current is detected through the light sources (e.g., LEDs) 128 via current sense resistors R4, R10.

The regulating circuit of the lighting system 200 may include a pulse-width modulator (PWM) U4 selectively coupled to the converter transformer T2 and coupled to the rectifier circuit and to the optocoupler U2.

The PWM U4 receives an enable signal from collector terminal of the phototransistor of optocoupler U2. The phototransistor may pull the collector terminal low while current is flowing through light sources (e.g., LEDs) 128. The collector terminal of the phototransistor may be coupled to a feedback pin FB of the PWM U4. The PWM U4 may be enabled to operate while the feedback pin FB is pulled low, and the PWM U4 may be operable to enter a fault mode while the feedback pin FB is not pulled low, e.g., the feedback pin FB>3 V.

While the PWM U4 is enabled, the PWM U4 drives a switch Q1 to regulate the converter transformer T2. The switch Q1 may be an n-channel MOSFET having a gate terminal, a drain terminal coupled to the converter transformer T2, and a source terminal. The PWM U4 may turn switch Q1 on at a respective gate terminal to permit current to flow through the primary winding PRI of the converter transformer T2 to store magnetic energy in the primary winding PRI of the converter transformer T2. The PWM U4 may turn switch Q1 OFF at the respective gate terminal to cause the magnetic energy that is stored in the primary winding PRI of the converter transformer T2 to be transferred to the LED secondary winding LED SEC of the converter transformer T2 in order to provide power to the light sources (e.g., LEDs) 128.

The PWM U4 may adjust the duty cycle by which switch Q1 is operated based upon current sensed through the primary winding PRI. The PWM U4 may receive current from the primary winding PRI at a current sense terminal CS. The current sense terminal CS receives a current and adjusts the duty cycle based upon the received current.

The PWM U4 may also receive a high voltage from the cathode terminals of D1 and D2 of the rectifier circuit. The PWM U4 may utilize the high voltage to provide a start-up sequence and a fault mode to the PWM U4.

The PWM U4 is an NCP1271 pulse-width modulator controller, according to one embodiment.

The regulation circuit also includes a capacitor C7 and a resistor R25. The capacitor C7 may be used in a power converter, such as the flyback converter illustrated in FIG. 2, to conduct electromagnetic interference (EMI) energy back into the primary side of the converter to enable the converter to pass electrical noise regulations established by a government agency, such as the FCC. The capacitor C7 may have a value of 10000 pF, according to one embodiment.

The resistor R25 may be used to protect the lighting system 200 from damage caused by ESD. As discussed above in connection with FIG. 1, the heat sink 130 may inject currents into the system ground which have been induced by near-by high power lines. The induced or discharged current flowing into the ground of the lighting system 200 is coupled to the common terminal of the primary winding PRI through the resistor R25. The resistor R25 may be 631 kΩ up to 2 MΩ. The resistor R25 is approximately 1.5 MΩ, according to one embodiment. The value of resistor R25 may be selected to be small enough to conduct the induced current from ground to the primary winding PRI and be selected to be large enough to pass government regulations that limit leakage current to values such as 3.5 mA.

The inclusion of the resistor R25 in the discharge path between the converter transformer T2 and ground provides a simple solution to ESD issues that may plague solid state illumination devices, especially when the solid state illumination devices are used to replace non-solid state traditional lighting lamps without an Earth ground to dissipate induced voltages.

The specific values, such as voltages, used herein are purely illustrative, and are not meant to be in anyway limiting on the scope. Likewise, the arrangements and topologies are merely illustrative and other arrangements and topologies may be employed where consistent with the teachings herein. While specific circuit structures are disclosed, other arrangements that achieve similar functionality may be employed.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act through the use of appropriate circuitry. For example, compensation and level shifting may be combined.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lighting system, comprising:
   at least one light emitting diode;
   a power supply coupled to the at least one light emitting diode and operable to convert a received power signal into a feedback-regulated power signal that is provided to the at least one light emitting diode, the power supply, including:
   a rectifier;
   a transformer coupled to the rectifier and having a primary winding and a secondary winding;
   a switch operable to at least partially control current passing through the primary winding;
   an overvoltage protection device coupled between an output of the rectifier and the primary winding; and
   an overcurrent protection device coupled between the switch and a common voltage reference that is common to the rectifier and the primary winding, the overcurrent protection device being operable to conduct an induced current from a ground reference node to the primary winding of the transformer; and
   a feedback circuit coupled between the at least one light emitting diode and the switch and operable to vary a magnitude of the feedback-regulated power signal.

2. The lighting system of claim 1 wherein the overvoltage protection device is a diode.

3. The lighting system of claim 1 wherein the overcurrent protection device is a resistor.

4. The lighting system of claim 3 wherein the resistor has a value of at least 631 Kiloohms and not greater than 3 Megaohms.

5. The lighting system of claim 3 wherein the resistor has a value of at least 1 Megaohm and not greater than 3 Megaohms.

6. The lighting system of claim 1 wherein the switch is at least one of a metal oxide semiconductor field effect transistor (MOSFET) and an insulated gate bipolar transistor (IGBT), and the overcurrent protection device is connected in parallel to a capacitor and is resistively coupled to a source terminal of the MOSFET or an emitter terminal of the IGBT.

7. The lighting system of claim 1 wherein the power supply is a flyback converter.

8. The lighting system of claim 1 wherein the feedback circuit senses a current through the at least one light emitting diode and in response pulse-width modulates a gate terminal of the switch to vary the magnitude of the feedback-regulated power signal.

9. A power supply to use with solid state lighting, comprising:
   a galvanized isolation transformer having a primary side and a secondary side; and
   a discharge path that electrically couples at least one of at least one light emitting diode, or a heat sink to which the at least one light emitting diode is thermally coupled, to a common ground of the primary side of the transformer via an overcurrent protection resistor, a capacitor electrically coupled in parallel with the overcurrent protection resistor, and a diode to handle current induced in the light emitting diode or the heat sink.

10. The power supply of claim 9 wherein the overcurrent protection resistor has a resistance that is at least 631 Kiloohms and not greater than 3 Megaohms.

11. The power supply of claim 9 wherein the overcurrent protection resistor has a resistance of at least 1 Megaohm and not greater than 3 Megaohms.

12. The power supply of claim 9, further comprising:
   a bulk capacitor filter at which the diode electrically couples the induced current to the overprotection resistor, wherein the diode is a transient voltage suppressor (TVS).

* * * * *